（12） United States Patent
Westerwich et al.

(10) Patent No.: US 7,867,772 B2
(45) Date of Patent: Jan. 11, 2011

(54) METHOD FOR THE DETERMINATION OF THE $CACO_3$ CONTENT OF A SCRUBBING LIQUID

(75) Inventors: Helmut Westerwich, Gelsenkirchen (DE); Manfred Kraus, Bochum (DE); Johannes Biernatzki, Gelsenkirchen (DE)

(73) Assignee: Lentjes GmbH (DE)

( * ) Notice: Subject to any disclaimer, the term of this patent is extended or adjusted under 35 U.S.C. 154(b) by 990 days.

(21) Appl. No.: 11/266,660

(22) Filed: Nov. 3, 2005

(65) Prior Publication Data

US 2006/0211124 A1 Sep. 21, 2006

(30) Foreign Application Priority Data

Mar. 11, 2005 (EP) .................. 05005352

(51) Int. Cl.
*G01N 33/00* (2006.01)
(52) U.S. Cl. .................. 436/128; 73/863.61; 73/864.21
(58) Field of Classification Search .................. 436/128; 73/864.21, 863.61
See application file for complete search history.

(56) References Cited

U.S. PATENT DOCUMENTS

| | | | |
|---|---|---|---|
| 3,226,195 A * | 12/1965 | De Lisle Nichols et al. . | 436/110 |
| 3,800,505 A | 4/1974 | Tarves, Jr. | |
| 3,948,608 A | 4/1976 | Weir, Jr. | |
| 3,950,137 A | 4/1976 | Larson et al. | |
| 4,151,255 A * | 4/1979 | Capuano et al. ............... | 422/76 |
| 4,329,649 A | 5/1982 | Scoates | |
| 4,683,210 A | 7/1987 | Onizuka et al. | |
| 5,993,640 A | 11/1999 | Risse | |

FOREIGN PATENT DOCUMENTS

| | | |
|---|---|---|
| DE | 3429952 A1 | 8/1984 |
| DE | 34 29 952 A1 | 2/1985 |
| DE | 3809379 C2 | 3/1988 |
| DE | 38 09 379 C2 | 5/1992 |
| DE | 19733284 C1 | 1/1997 |
| DE | 197 33 284 C1 | 12/1998 |
| EP | 0162536 A1 | 2/1985 |
| WO | 2004/011127 A1 | 5/2004 |

OTHER PUBLICATIONS

Patent Abstracts of Japan, (1 page), Publication No. 09101296 dated Apr. 15, 1997.
Communication from European Patent Office regarding related application, 2005.

* cited by examiner

*Primary Examiner*—Michael A Marcheschi
*Assistant Examiner*—Jonathan M Hurst
(74) *Attorney, Agent, or Firm*—Harness, Dickey & Pierce, P.L.C.

(57) ABSTRACT

The present invention relates to a method for the determination of the $CaCO_3$, content of a scrubbing liquid, which has been separated from a scrubbing liquid circuit of a scrubbing column.

15 Claims, 1 Drawing Sheet

METHOD FOR THE DETERMINATION OF THE $CaCO_3$ CONTENT OF A SCRUBBING LIQUID

BACKGROUND

The present invention relates to a method for the determination of the $CaCO_3$ content of a scrubbing liquid, which has been separated from a scrubbing liquid circuit of a scrubbing column.

DISCUSSION

Scrubbing columns of the above mentioned type serve for flue gas purification, for example for purifying flue gases from a coal power station or the like. Normally they comprise a scrubbing column having scrubbing liquid nozzles, which are often arranged on several levels, a scrubbing liquid sump, in which scrubbing liquid is collected, and an absorption zone, which extends inside a cylindric receptacle of the scrubbing column from the scrubbing liquid sump towards the upper scrubbing liquid nozzle level. Flue gas is introduced into a lower section of the absorption zone in the scrubbing column, flows upwards from there and leaves the scrubbing column through an outlet provided above the scrubbing liquid nozzles. On its way through the scrubbing column, the flue gas gets into contact with scrubbing liquid emerging from the scrubbing liquid nozzles and is purified, which is described in the following.

The scrubbing liquid preferably contains, apart from water, alkaline earths, which react with the sulphur oxides present in the flue gas and the sulphur oxides generated in the scrubbing column. Lime in form of calcium oxide, calcium hydroxide, calcium carbonate or the like is in particular used.

The alkaline earths react with the sulphur oxides present in the flue gas essentially to calcium sulphite, which is bound in the scrubbing liquid. In this manner, the flue gas is purified from the undesirable sulphur oxides and flows out of the purification device afterwards. However, the scrubbing liquid containing the calcium sulphite particles, which are kept floating in this one, flows into the scrubbing liquid sump and is collected there.

Calcium sulphate, which is generated during the flue gas desulfurization, has similar positive properties as natural gypsum. It is thus a desired by-product of the flue gas purification process, which is won from the scrubbing liquid collected in the scrubbing liquid sump. The calcium sulphate particles are removed together with the scrubbing liquid from the scrubbing liquid sump and are then extracted from the scrubbing liquid in a subsequent process. The calcium sulphate can then be further processed to materials, in particular construction materials.

For winning calcium sulphate of good quality it has to be taken care that as few alkaline earths as possible are contained in the scrubbing liquid collected in the scrubbing liquid sump, when the scrubbing liquid is removed from the scrubbing liquid sump for winning calcium sulphate.

On the other hand, it has to be assured that enough alkaline earths are present in the scrubbing liquid, in order to provoke a sufficient reaction in the absorption zone of the scrubbing column.

For determining the exact concentration of alkaline earths in the scrubbing liquid, it is known to determine the $CaCO_3$ content of the scrubbing liquid.

DE-A-19733284 describes a method for measuring the $CaCO_3$ content of a scrubbing suspension, in particular from the absorber of a flue gas purification device, in which a predetermined constant measuring stream in the bypass is continuously supplied to a pH measuring device and the pH value of the suspension is measured. Herein, the measuring stream is inoculated with an acid at an inoculation point in front of the pH measuring device in temporal intervals and the change of the pH value, which results from the inoculation with the acid, is measured. The $CaCO_3$ content of the suspension is afterwards determined from the difference of the measured pH values by comparison with data from reference measurements, which have been made in consideration of the residence time of the suspension for the flowing distance between the inoculation point and the pH measuring device. Decisive for the precision of the method is the fact that a certain acid volume is added to the predetermined suspension volume at the inoculation point and both volumes are sufficiently mixed with each other on their way to the pH measuring device, such that a correct measurement of the pH value can be carried out at the pH measuring device. In particular the precise dosage of the suspension and acid volume requires a high effort and can easily lead to inaccuracies, which then also have an effect on the accuracy of the measured pH value. A supervision of a correct dosage is also difficult to realize with this method. As a result, the method has some sources of error, which can adversely affect the reliability thereof.

DE-A-3809379 describes a method for the determination of the carbonate content of a partially used lime stone suspension, which continuously circulates in a flue gas purification device, for regulating the addition of fresh lime stone powder. Herein, a constant subset of the lime stone suspension is respectively extracted from a branch piping, which subset is separated from the circuit for measuring purposes. Acid is then added to this subset. Finally, the volume of the generated $CO_2$ is measured at constant temperature and under constant pressure and the value is used for the addition of fresh lime stone powder. Strictly speaking, in this method the gas quantity from the increase of pressure in a gas tight measuring cell and of the temperature in the measuring cell is measured in consideration of the change of volume caused by the addition of acid, and based upon this gas quantity, the carbonate content of the lime stone suspension is determined. In comparison to DE-A-19733284, this is thus an alternative method for the determination of the carbonate content.

OBJECTS AND SUMMARY OF THE INVENTION

It is an object of the present invention to provide an improved or alternative method for the determination of the $CaCO_3$ content of a scrubbing liquid, which has been separated from a scrubbing liquid circuit of a scrubbing column as well as a corresponding device.

In the method according to the present invention, a predetermined test volume of scrubbing liquid is at first separated from a continuously available scrubbing liquid volume flow. The test volume is then supplied to a measuring cell, in the same way as a previously dosed, predetermined HCl volume. Both volumes are mixed with each other and react with each other afterwards within a predetermined reaction time. Finally, the pH value of the so produced mixture is measured and the $CaCO_3$ content is determined based upon the change of the pH value.

In comparison to DE-3809379, the method according to the invention is an alternative method for the determination of the $CaCO_3$ content, in which not the volume of the generated $CO_2$ is measured at constant temperature and under constant pressure, but the pH value of the mixture of scrubbing liquid and HCl, which is present in the measuring cell, is detected.

In contrast to DE-A-19733284, scrubbing liquid and acid are not mixed in a pipe and then the pH value is measured, but a predetermined test volume of scrubbing liquid is separated from a continuously available scrubbing liquid volume flow and supplied, together with a dosed, predetermined HCl volume, to a measuring cell, both volumes are mixed and finally, after a predetermined reaction time, the pH value is measured. In comparison to DE-A-19733284, the method according to the invention has the advantage that it can be assured that both the scrubbing liquid test volume and the HCl volume can be precisely dosed. A correct mixing of both volumes can also be assured. Accordingly, the pH value determined by means of the method according to the invention is more accurate. Furthermore, the scrubbing liquid volume flow, the test volume in the measuring cell and the dosed HCl volume can for example be supervised by simple means and thus the plausibility of the pH measurement, which has been carried out by means of the method, can be verified, if this is desired.

According to a preferred variant of the method according to the present invention, the separation of the predetermined scrubbing liquid test volume is carried out by means of a sampling trap, which can be realized by relatively simple means, and the determination of the $CaCO_3$ content is carried out by means of a pH probe.

The scrubbing liquid volume flow, from which the predetermined scrubbing liquid volume is separated, is preferably a separately produced scrubbing liquid volume flow. This means that a separate scrubbing liquid circuit and thus a separate scrubbing liquid volume flow is generated for example by means of a closed circular pipeline, which is exclusively used for the measurement of the pH value. This has the advantage that the operation of the closed circular pipeline is independent from foreign pre-pressures, such that a self-supporting, stable circuit can be achieved by the design of the closed circular pipeline and the pump provided in this one. Such an extraction from the absorber and the operation of the closed circular pipeline with a separate pump have proved successful in many installations for realizing pH and density/solids measurements due to their operational reliability. However, the disadvantage of these designs is the higher investment costs for the additional arrangement of these closed circular pipelines.

It is to be understood that the scrubbing liquid test volume can of course also be extracted from a pipe with pressure inside, e.g. from the pipe, which leads from the scrubbing liquid sump to the scrubbing liquid nozzles. However, an independent pipe for carrying out the $CaCO_3$ measurement is preferred.

According to another advantageous embodiment of the method according to the invention, the scrubbing liquid test volume and/or the dosed HCl volume can be modified.

Furthermore, it is advantageous if the measuring equipment, which is used for the measuring cell, is regularly calibrated, in order to be able to always assure the required accuracy of the $CaCO_3$ measurement. The calibration is advantageously carried out by wet analytical comparison measurements.

Furthermore, at least the measuring cell and the sampling trap as well as the associated pipes are cleaned in regular time intervals, in order to correspondingly prevent deposits of solid matters.

Finally it is preferred according to the method of the invention that the plausibility of the pH measurement is verified by means of supervision of the scrubbing liquid volume flow, the test volume in the measuring cell and the dosed HCl volume, in order to assure a correct functioning of the method.

The device according to the invention for the determination of the $CaCO_3$ content of a scrubbing liquid comprises a closed circular pipeline, a pump, which is actively connected to the closed circular pipeline, a sampling trap provided in said closed circular pipeline for separating a scrubbing liquid sample and a measuring cell, which is connected to the sampling trap and which has a measuring equipment for determining the pH value of a scrubbing liquid sample.

Herein, the measuring equipment advantageously comprises an HCl dosage device and a pH probe for the determination of the pH value.

Furthermore, a rinsing device and/or an aerating are preferably provided.

The sampling trap advantageously comprises a by-pass, via which the scrubbing liquid is by-passed by means of the sampling trap during the separation of the scrubbing liquid test volume, in order to not interrupt the scrubbing liquid volume flow in the closed circular pipeline, such that this one is continuously available.

BRIEF DESCRIPTION OF THE DRAWING

In the following, a preferred embodiment of the present invention is described in detail with reference to the annexed FIG. 1 which shows a schematic view of an embodiment of the device according to the invention for the determination of the $CaCO_3$ content of a scrubbing liquid.

DESCRIPTION OF THE PREFERRED EMBODIMENTS

Figure 1:
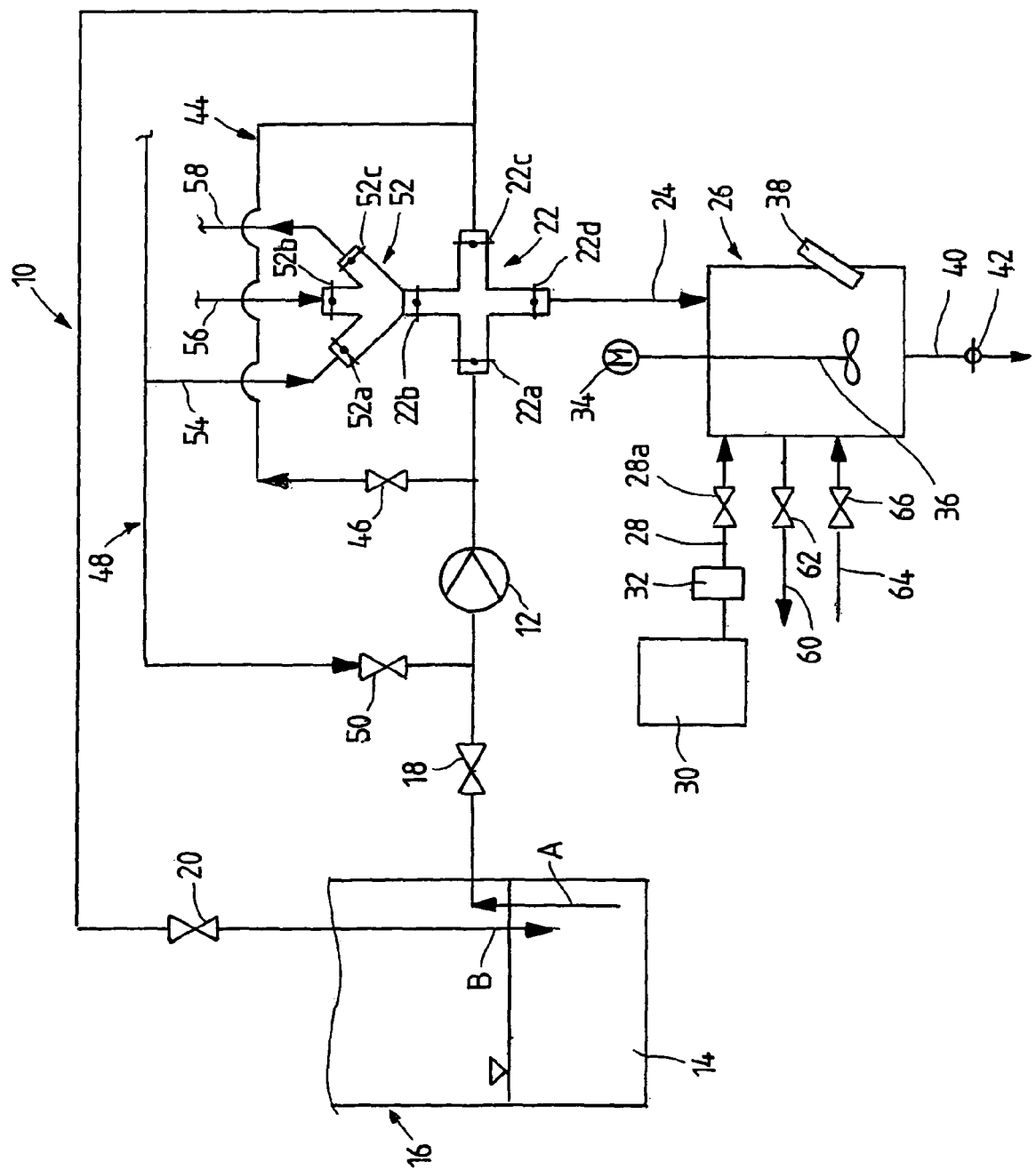

The represented device comprises a closed circular pipeline 10, through which scrubbing liquid is pumped by means of a pump 12 from a scrubbing liquid sump 14 of a scrubbing column 16, which is only partially represented in the drawing. Herein, the scrubbing liquid, which has been extracted from said scrubbing liquid sump 14, is returned to said scrubbing liquid sump 14 after flowing through the closed circular pipeline 10, as it is indicated by the arrows A and B. The closed circular pipeline 10 further comprises stop valves 18 and 20, which alternatively allow or prevent a passage of scrubbing liquid.

Downstream of said pump 12, a sampling trap 22 is arranged in the closed circular pipeline, which sampling trap permits to separate a predetermined scrubbing liquid test volume from said closed circular pipeline. The sampling trap 22 is connected via a pipe 24 to a measuring cell 26, which can be supplied with a scrubbing liquid test volume separated in said sampling trap 22. Furthermore, pipe 28, which can be opened and closed by means of the stop valve 28a, allows the introduction of an HCl volume into said measuring cell 26, wherein the HCl acid is taken from an HCl store tank 30 and the HCl volume, which shall be supplied to said measuring cell, is dosed in a dosage device 32. Said measuring cell 26 further comprises an agitator 36 driven by a motor 34, by means of which the scrubbing liquid and HCl volumes supplied to said measuring cell 26 can be mixed. After mixing both volumes, the pH value of the mixture can be determined by means of a pH probe 38. By opening a stop valve 42 provided in a pipe 40, the mixture can be evacuated from the measuring cell after determination of the pH value thereof.

For by-passing the sampling trap 22, said closed circular pipeline 10 comprises a by-pass 44 having a stop valve 46.

For cleaning said closed circular pipeline 10, a rinse water pipe 48 having a stop valve 50 is further provided. If said valve 50 is opened, the rinse water can enter in the direction of pump 12 into said closed circular pipeline 10.

Finally, a connecting branch 52 is placed at the sampling point 22, which connecting branch comprises three inlets with corresponding stop valves 52a, 52b and 52c. By opening the corresponding stop valves 52a or 52b, rinse water can be introduced via pipe 54 or alternatively compressed air can be introduced via pipe 56 into said connecting branch 52 and with opened stop valve 22b into said sampling trap 22. By opening stop valve 52c, an aerating can be realized via pipe 58. A corresponding aeration pipe 60 having a stop valve 62 and a rinse water inlet pipe 64 having a stop valve 66 are connected to said measuring cell 26.

The operation of the device represented in FIG. 1 will be described in detail in the following.

In the initial position, all valves 18, 20, 22a through 22d, 42, 46, 50, 52a through 52c, 62 and 66 are closed. For starting the represented device, the sop valves 18, 20, 22a and 22c are opened and pump 12 is switched on. Then, scrubbing liquid is pumped by means of said pump 12 from said scrubbing liquid sump 14 of scrubbing column 16 into said closed circular pipeline 10 through said sampling trap 22 back into said scrubbing liquid sump 14.

If a predetermined scrubbing liquid volume shall be evacuated from said closed circular pipeline 10 by means of said sampling trap 22, stop valve 22c of said sampling trap 22 is at first closed.

In this way, a predetermined scrubbing liquid volume is dammed up in said sampling trap 22 and is enclosed in this one by closing stop valve 22a of sampling trap 22. When stop valve 22a of said sampling trap 22 is closed, stop valve 46 of by-pass 44 is simultaneously opened, such that the scrubbing liquid no longer flows through said sampling trap 22, but through by-pass 44 back into said scrubbing liquid sump 14. The predetermined scrubbing liquid volume, which is contained in said sampling trap 22, is guided via pipe 24 into measuring cell 26 by opening said stop valve 22d and 52c of said sampling trap 22. An HCl volume, which is adapted to the scrubbing liquid volume, which has been introduced into said measuring cell 26, is dosed in the dosage device 32 and is guided via pipe 28 into said measuring cell 26 by opening stop valve 28a. Agitator 36, which is driven by means of motor 34, mixes the scrubbing liquid volume with the HCl volume in said measuring cell 26. After a predetermined reaction time, the pH value of the mixture, which is present in said measuring cell 26, is determined by means of pH probe 38. As soon as the pH value has been determined, the mixture can be evacuated via pipe 40 by opening stop valve 42.

For taking the next sample by means of said sampling trap 22, said stop valves 22d and 46 have to be closed again and said stop valve 22a has to be opened again, such that scrubbing liquid flows again into the sampling trap.

If said closed circular pipeline 10 and said by-pass 44 shall be cleaned, valves 22a and 22c of said sampling trap 22 have to be closed and valve 46 has to be opened. Then, rinse water can flow through rinse water pipe 48 through the corresponding components and afterwards through the opened stop valve 20 back into said scrubbing column 16. It is also possible to rinse said sampling trap 22 and the connecting pipes thereof and said closed circular pipeline 10 with closed valves 46, 22b and 22d as well as opened valves 50, 22a, 22c and 20.

For the individual cleaning of said sampling trap 22, valves 22a and 22c thereof have to be closed and valves 22b and 22d thereof have to be open. By opening valve 52a, rinse water can flow from pipe 54 through connecting branch 52 into said sampling trap 22 and rinse this one. Form there, it flows through pipe 24 into said measuring cell 26, then it flows out via pipe 40 by opening stop valve 42.

The measuring cell itself can be filled with rinse water via pipe 64 by opening valve 66. After rinsing, the water also flows out via valve 42 and pipe 40.

It is to be understood that the represented device according to the invention is only an example and other modifications and changes are possible without leaving the protected scope of the present invention, which is defined by the annexed claims.

The invention claimed is:

1. A method for the determination of the $CaCO_3$ content of a scrubbing liquid, which has been separated from a scrubbing liquid circuit of a scrubbing column, comprising the steps of:
    separating a predetermined scrubbing liquid test volume from a separate, continuously available scrubbing liquid volume flow using a sampling trap, which separating further comprises the steps of:
        damming up a predetermined scrubbing liquid volume inside said sampling trap by closing all stop valves in each outlet of said sampling trap; and
        enclosing the predetermined scrubbing liquid volume in said sampling trap by closing a stop valve in a scrubbing liquid inlet of said sampling trap;
    supplying the scrubbing liquid test volume to a measuring cell by opening a stop valve in a measuring cell outlet of said sampling trap,
    dosage and supplying of a predetermined HCl volume directly to the measuring cell downstream of the sampling trap,
    mixing of the supplied volumes,
    awaiting the end of a predetermined reaction time,
    measuring the pH value of the supplied volumes, and
    determining the $CaCO_3$ content of the test volume based upon the change of the measured pH value.

2. The method according to claim 1, wherein the step of determining the CaCO3 content is carried out by means of a pH probe.

3. The method according to claim 1, in which the scrubbing liquid test volume and/or the dosed HCl volume can be modified.

4. The method according to claim 1, further comprising regularly calibrating the measuring equipment, which is used for the measuring cell.

5. The method according to claim 4, wherein the step of regularly calibrating the measuring equipment comprises realizing wet analytical comparison measurements.

6. The method according to claim 1, further comprising the step of cleaning the measuring cell and the sampling trap in regular time intervals.

7. The method according to claim 1, further comprising the steps of:
    supervising the scrubbing liquid volume flow;
    supervising the test volume in the measuring cell; and
    supervising the dosed HCl volume;
    for verifying the plausibility of the pH measurement.

8. The method according to claim 1, further comprising the steps of:
    opening a stop valve comprised in a rinse water inlet of said sampling trap;
    flowing rinse water into said sampling trap through said rinse water inlet; and
    opening a stop valve comprised in an outlet of said sampling trap for discharging the rinse water.

9. A method for the determination of the $CaCO_3$ content of a scrubbing liquid, the method comprising:
    directing a liquid test volume from a scrubbing liquid volume flow into a separate measuring cell via a line of a sampling trap such that the liquid test volume in the measuring cell is fluidly separated from the scrubbing liquid volume flow, which fluidly separating the liquid test volume comprises the steps of:

damning up a predetermined scrubbing liquid volume inside said sampling trap by closing all stop valves in each outlet of said sampling trap; and enclosing the predetermined scrubbing liquid volume in said sampling trap by closing a stop valve in a scrubbing liquid inlet of said sampling trap;

introducing and mixing a predetermined volume of HCl into the liquid test volume within the measuring cell, awaiting the end of a predetermined reaction time, and measuring a pH value of the liquid test volume within the measuring cell, and determining a $CaCO_3$ content of the liquid test volume based upon the change of the measured pH value.

10. The method according to claim 9, further comprising:
evacuating the liquid test volume from the measuring cell following the step of measuring a pH value such that the evacuated liquid test volume remains separate from the scrubbing liquid volume flow.

11. The method according to claim 9, in which the determination of the CaCO3 content is carried out by means of a pH probe.

12. The method according to claim 9, in which the scrubbing liquid test volume and/or the dosed HCl volume can be modified.

13. The method according to claim 9, further comprising calibrating equipment to be used for the step of measuring a pH value.

14. The method according to claim 13, wherein the step of calibrating equipment comprises calibrating equipment using wet analytical comparison measurements.

15. The method according to claim 9, further comprising:
verifying the plausibility of the pH measurement by monitoring the scrubbing liquid volume flow, the test volume in the measuring cell and the dosed HCl volume.

* * * * *